(12) United States Patent
Larsen et al.

(10) Patent No.: US 7,601,922 B2
(45) Date of Patent: Oct. 13, 2009

(54) CABLE PATHWAY PATCH PANEL RACK WITH WATERFALL BASE

(75) Inventors: Lars R. Larsen, Old Lyme, CT (US); Stewart A. Levesque, Scotland, CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 11/810,063

(22) Filed: Jun. 4, 2007

(65) Prior Publication Data

US 2008/0017760 A1      Jan. 24, 2008

(51) Int. Cl.
  *H02G 3/04*      (2006.01)
(52) U.S. Cl. .................. 174/481; 174/58; 174/68.1; 174/68.3; 174/72 A; 439/540.49; 385/135
(58) Field of Classification Search ............ 174/58, 174/68.1, 68.3, 72 A, 48; 220/3.2, 3.9, 3.6; 385/134–137; 439/540.49, 540.1, 49; 361/826; 248/65, 68.1, 74.3
See application file for complete search history.

(56) References Cited

U.S. PATENT DOCUMENTS

| | | | |
|---|---|---|---|
| 2,140,376 A | 12/1938 | Anderson | |
| 2,363,327 A | 11/1944 | Hodgkins et al. | |
| 2,896,009 A | 7/1959 | Caveney | |
| 3,909,505 A | 9/1975 | Taylor | |
| 4,158,754 A | 6/1979 | Yonezaki et al. | |
| 4,204,095 A | 5/1980 | De Luca et al. | |
| 4,576,302 A * | 3/1986 | Smolik .................. 220/3.5 |
| 4,603,377 A | 7/1986 | Kobayashi et al. | |
| 4,641,754 A | 2/1987 | Hebel et al. | |
| 4,665,546 A | 5/1987 | Brey et al. | |
| 4,811,169 A | 3/1989 | De Luca et al. | |
| 5,023,404 A | 6/1991 | Hudson et al. | |
| 5,153,819 A | 10/1992 | Hebel | |
| 5,188,318 A | 2/1993 | Newcomer et al. | |

(Continued)

OTHER PUBLICATIONS

U.S. Patent Office Action mailed on Oct. 19, 2006 in U.S. Appl. No. 11/490,361.

(Continued)

*Primary Examiner*—Dhiru R Patel
(74) *Attorney, Agent, or Firm*—McCarter & English, LLP (57) ABSTRACT

The present disclosure provides for assemblies and methods for mounting a patch panel rack to a wire cable management pathway. A waterfall base is mounted with respect to and in between a pair of mounting brackets. Each of the pair of mounting brackets includes a support surface defining a top portion and a bottom portion, a front side surface and a rear side surface. The top portion associated with the support surface includes at least one upwardly extending wire cable management pathway mounting feature adapted to securely mount the pair of mounting brackets with respect to a wire cable management pathway. The wire management pathway mounting feature can be at least one substantially curved mounting clip feature having a horizontally extending fold over tab defining a gap opening to receive at least one wire associated with a wire cable management pathway. The curved mounting clip feature is fabricated to substantially curve inwardly with respect to the waterfall base thereby substantially defining a U-shape geometry. In an further exemplary embodiment, the top portion associated with the support surface includes a plurality of upwardly extending wire cable management pathway mounting features.

15 Claims, 9 Drawing Sheets

U.S. PATENT DOCUMENTS

| | | | |
|---|---|---|---|
| 5,574,251 A | 11/1996 | Sevier | |
| 5,586,012 A | 12/1996 | Lerman | |
| 5,758,002 A | 5/1998 | Walters | |
| 5,765,698 A | 6/1998 | Bullivant | |
| D404,010 S | 1/1999 | Viklund et al. | |
| D404,364 S | 1/1999 | Viklund et al. | |
| 5,902,961 A | 5/1999 | Viklund et al. | |
| 5,921,402 A | 7/1999 | Magenheimer | |
| 6,102,214 A | 8/2000 | Mendoza | |
| 6,170,784 B1* | 1/2001 | MacDonald et al. | 248/65 |
| 6,365,830 B1* | 4/2002 | Snider et al. | 174/484 |
| 6,365,834 B1 | 4/2002 | Larsen et al. | |
| 7,119,282 B2* | 10/2006 | Krietzman et al. | 174/101 |
| 7,173,186 B1* | 2/2007 | Hageman | 174/58 |
| 7,184,644 B2* | 2/2007 | Johnson et al. | 385/134 |
| 7,207,835 B2* | 4/2007 | Levesque et al. | 439/540.1 |
| 7,234,674 B2* | 6/2007 | Rippel et al. | 248/343 |
| 7,360,745 B2* | 4/2008 | Nikayin et al. | 248/216.1 |

OTHER PUBLICATIONS

Response to Office Action mailed on Jan. 16, 2007 in U.S. Appl. No. 11/490,361.

U.S. Patent Office Action mailed on Jun. 11, 2007 in U.S. Appl. No. 11/490,361.

Request For Continued Examination mailed on Oct. 10, 2007 in U.S. Appl. No. 11/490,361.

U.S. Patent Office Action mailed Dec. 28, 2007 in U.S. Appl. No. 11/490,361.

Response to Office Action mailed on Mar. 27, 2008 in U.S. Appl. No. 11/490,361.

U.S. Patent Office Action mailed on Jun. 17, 2008 in U.S. Appl. No. 11/490,361.

* cited by examiner

CABLE PATHWAY PATCH PANEL RACK WITH WATERFALL BASE

CROSS-REFERENCE TO RELATED APPLICATIONS

The present application claims the benefit under 35 U.S.C. § 120 of U.S. Non-Provisional application Ser. No. 11/490,361 filed Jul. 20, 2006, which is hereby incorporated by reference in its entirety for all purposes.

BACKGROUND

1. Technical Field

The present disclosure relates to assemblies and methods for mounting a patch panel rack to a cable pathway in a telecommunication data center.

2. Background Art

Modern buildings, particularly commercial buildings, require an effective and efficient telecommunications infrastructure to support the wide variety of services that rely on the electronic transport of information. Typically, wiring systems within buildings are terminated in a central wiring closet where they may be interconnected with one another, and/or to other cabling systems or telecommunications equipment. Cables are often terminated on wire panels (such as RJ-45 patch panels) or the like, which are mounted either to racks, or to stand-off brackets affixed to a wall.

Patch panels are well known in the field of data communication systems. A patch panel generally provides a plurality of network ports incorporated into a single structural element that connect incoming and outgoing lines of a local area network (LAN) or other communication, electronic or electrical system. Patch panels are usually housed within a telecommunications closet or in an alternative location appropriate for patching cables. Typical patch panels are mounted hardware units that include a plurality of port locations (e.g., twenty four or forty eight) that function as a sort of static switchboard, using cables to interconnect computers associated with a LAN and/or to connect computers to an outside network, e.g., for connection to the Internet or other wide area network (WAN). A patch panel generally uses a sort of jumper cable, called a patch cord, to create each interconnection.

In a typical installation, the patch panel connects a network's computers to each other and to the outside lines that enable the LAN to connect to the Internet or another WAN. Connections are generally made with patch cords and the patch panel allows circuits to be easily and efficiently arranged and rearranged by plugging and unplugging the patch cords. Patch panel systems are generally intended to facilitate organization and management in implementing telecommunications wiring systems, e.g., for high speed data networks.

Patch panels are routinely mounted between rack elements so as to permit wires or cables, e.g., unshielded twisted pair (UTP) cables, to be wired to IDCs positioned at the rear face of the patch panel, and to further permit patch plugs to be plugged into jacks or ports positioned in the front face of the patch panel. Wires/cables are routed to the desired location at the rear of the patch panel, i.e., in the bounded region defined by spaced rack elements. Patch cords are routed to the desired jack/port on the front face of the patch panel, e.g., from a raceway or the like. Thus, for cable management purposes, the patch cords are generally drawn toward one or the other side of the patch panel at the front of the rack system and, from there, routed to the desired component and/or network communication location.

Stand-off brackets typically consist of metal forms with a back panel (which may be affixed to a wall or a rack) and side walls extending from the back panel. The back panel may include a hole through which wires are leaded for connection to a wire panel attached across the side walls. Patch panels affixed to a rack and/or a telecommunications closet affords convenient access to telecommunication devices such as servers, for example, within the same rack or closet.

As the demand for the use of telecommunication devices rapidly grows, space for such devices becomes both limited and expensive. Although in some environments, patch panels are affixed to a rack, closet, and/or cabinet along with the respective devices, such as servers, the demand for space has created a need to place the patch panels in a separate location. Typically, if space is needed for more servers, for example, patch panels are mounted on a wall within a data center.

Many rows of cabinets or racks typically fill a data center or telecommunications room. Data cables from each cabinet stretch many feet to reach patch panels mounted on a far wall making immediate access more difficult and inconvenient than having the patch panels in closer proximity. Removing the patch panels from the cabinets saves cost by creating more space for servers, however, additional burdens exist as a result. Mounting patch panels on a wall requires lengthy and costly cables to stretch across burdensome lengths. Moreover, TIA/EIA requirements place cable length limitations for certain types of data cables, such as Cat 5 or 6. This in turn requires burdensome planning, organizing and cost in order to be compliant with industry requirements.

Accordingly, a need exists for mounting a patch panel in a convenient location that allows for advantageous cable management within a data center. These and other disadvantages and/or limitations are addressed and/or overcome by the assemblies and methods of the present disclosure.

SUMMARY

The present disclosure provides for assemblies and methods for mounting a plurality of ports with respect to a wire cable management pathway to facilitate more efficient access to the ports from a telecommunications closet. In an exemplary embodiment, the present disclosure provides for a data communications port mounting assembly including: (a) a pair of mounting brackets; and (b) a waterfall base mounted with respect to and between the pair of brackets. Each of the pair of mounting brackets includes a support surface defining a top portion and a bottom portion, a front side surface and a rear side surface. The top portion associated with the support surface includes at least one upwardly extending wire cable management pathway mounting feature adapted to securely mount the pair of mounting brackets with respect to a wire cable management pathway. At least one of either the front side surface or the rear side surface associated with the bracket is adapted to host a plurality of ports.

In an exemplary embodiment, the wire management pathway mounting feature is at least one substantially curved mounting clip feature having a horizontally extending fold over tab defining a gap opening to receive at least one wire associated with a wire cable management pathway. The fold over tab is adapted to fold over the at least one wire received by the defined gap opening to allow for mounting of each of the pair of brackets with respect to the wire cable management pathway. The curved mounting clip feature can be fabricated to substantially curve inwardly with respect to the waterfall base thereby substantially defining a U-shape geometry. In an exemplary embodiment, the top portion associated with the support surface includes a plurality of upwardly extending wire cable management pathway mounting features. Typically, the plurality of ports are included on a patch panel mounted with respect to the mounting brackets.

The waterfall base should be adapted to allow for cables to (i) electrically connect to the plurality of ports; and (ii) maintain a desired bend radius. In an exemplary embodiment, the cable management pathway is a wire raceway and the mounting brackets are mounted with respect to an underneath surface of the wire raceway such that the brackets are positioned underneath the wire raceway. In an exemplary embodiment, the front side surface and the rear side surface are integrally formed with the support surface and each of the front side surface and the rear side surface: (i) extend inwardly towards the oppositely positioned bracket; and (ii) substantially define a perpendicular relationship with respect to the support surface.

The present disclosure provides for an exemplary assembly such that at least one of the front side surface and the rear side surface define a plurality of patch panel mounting apertures adapted to allow for mounting of at least a patch panel hosting a plurality of ports. In an exemplary embodiment, the front side surface and the rear side surface each define a plurality of patch panel mounting apertures substantially vertically aligned and the front side surface and the rear side surface are substantially aligned and parallel with respect to each other. The plurality of patch panel mounting apertures associated with each of the brackets can allow for adjustably mounting a patch panel rack with respect to the brackets.

Typically, the waterfall base includes a front portion integrally formed with a rear portion such that the front portion defines a substantially flat surface having a curved drop-off portion on opposite horizontal ends and the rear portion defines a substantially flat surface extending rearwardly with respect to front portion and includes a mounting flange at each horizontal end. Each of the mounting flanges define at least one flange aperture and the bottom portion of the support surface associated with the mounting bracket defines at least one support aperture aligned with the at least one flange aperture such that a securing feature can pass through the flange and the support surface to secure the waterfall base with respect to the bracket.

The present disclosure provides for an exemplary method for cable management and data communication port access associated with telecommunications closets including the steps of: (a) providing a plurality of ports hosted on a pair of mounting brackets; (b) positioning a waterfall base between the pair of mounting brackets; and (c) mounting the mounting brackets with respect to a wire cable management pathway. Each of the pair of mounting brackets includes a support surface defining a top portion and a bottom portion, a front side surface and a rear side surface. The top portion associated with the support surface includes at least one upwardly extending wire cable management pathway mounting feature adapted to securely mount the pair of mounting brackets with respect to a wire cable management pathway. At least one of either the front side surface or the rear side surface associated with the bracket are adapted to host a plurality of ports.

Additional features, functions and benefits of the disclosed assemblies and methods will be apparent from the description which follows, particularly when read in conjunction with the appended figures.

BRIEF DESCRIPTION OF THE DRAWINGS

To assist those of ordinary skill in the art in making and using the disclosed assemblies and methods, reference is made to the appended figures, wherein.

DESCRIPTION OF EXEMPLARY
EMBODIMENT(S)

Assemblies and methods are disclosed that are effective in efficiently managing cables in a data center or telecommunications closet connecting to a plurality of ports typically associated with a patch panel.

Figure 1:
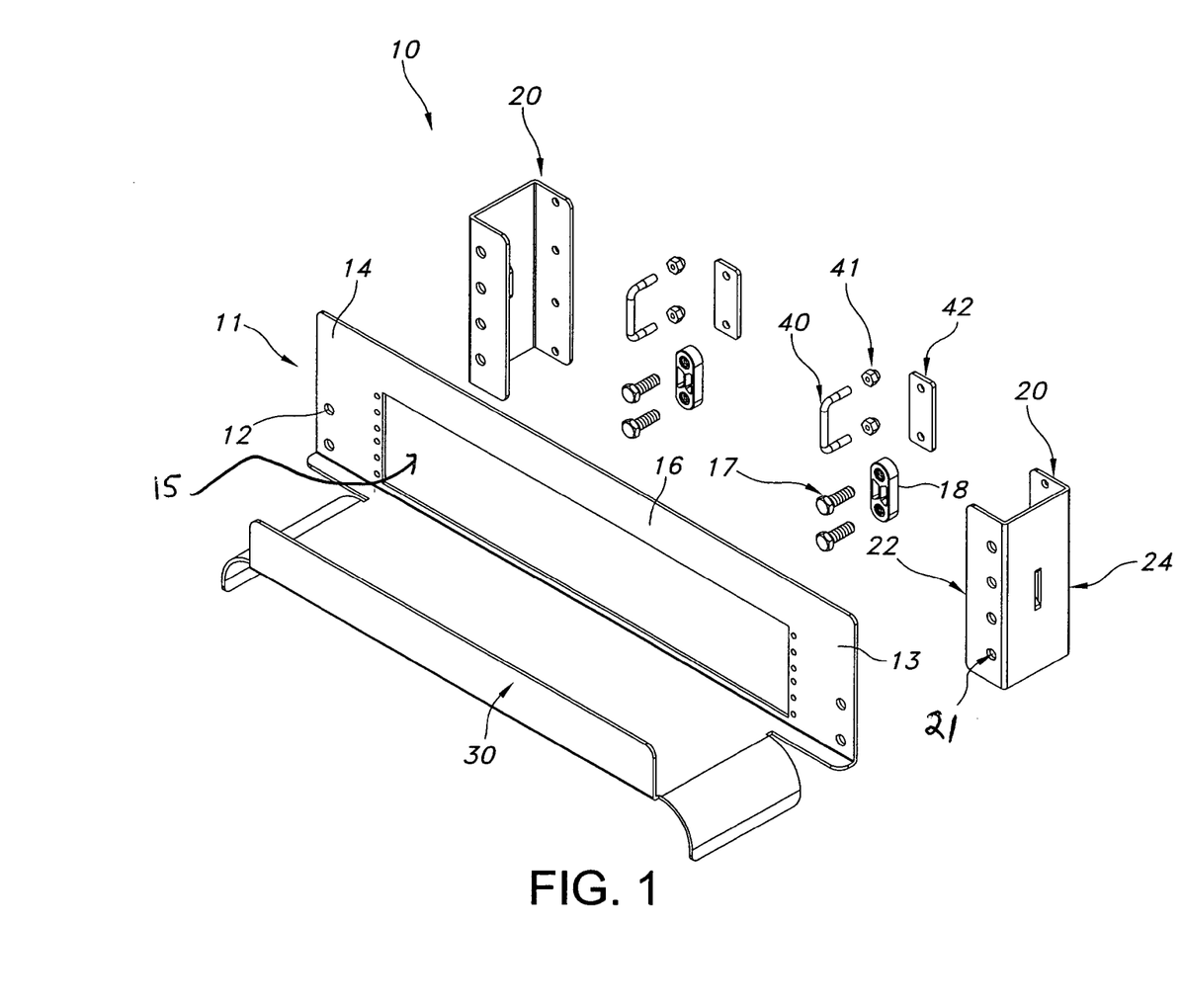
FIG. 1 is a schematic illustrating an exploded view of an assembly associated with the present disclosure.

FIG. 1 is a schematic illustrating an exploded view of an assembly associated with the present disclosure. FIG. 1 is exploded to illustrate individual components of an assembly 10. Assembly 10 includes patch panel rack 11 adapted to host a plurality of ports. Typically, ports are included in a patch panel. An exemplary patch panel rack 11 is adapted to host a plurality of patch panels. In an exemplary embodiment, typically patch panel rack 11 is adapted to host either angled patch panels or flat patch panels within an opening 15. Rack 11 typically defines a plurality of apertures 12 and is adapted to be mounted onto at least one mounting bracket 20. In an exemplary embodiment, assembly 10 includes two mounting brackets 20, each defining a plurality of apertures 21 on both a front side 22 of each of mounting brackets 20 and a rear side 24 of each of mounting brackets 20. In an exemplary embodiment, rack 11 defines two apertures 12, substantially vertically aligned on each of a first end 13 and a second end 14 of front face 16 of patch panel rack 11.

Apertures 12 are adapted to align with apertures 21 such that rack 11 can be adjustably mounted to brackets 20. In an exemplary embodiment, brackets 20 each define four apertures 21 substantially vertically aligned on both front side 22 and rear side 24. Typically, threaded screws 17 connect rack 11 to brackets 20 through apertures 12 and apertures 21 on front side 22 and mate with a double nut 18 structurally securing assembly 10. In an exemplary embodiment, bolts and/or locking pins can be used as a connecting means for mounting rack 11 to brackets 20. Having a plurality of apertures on mounting bracket 20 allows for a user to conveniently adjust rack 11 vertically on brackets 20. Adjustably mounting rack 11 to brackets 20 affords a user to adjust the height and/or position of assembly 10 to accommodate for varying environments.

In an exemplary embodiment, brackets 20 and rack 11 can define an elongated slot. The elongated slot (not shown) is typically substantially vertical and adapted to allow a connecting means to provide structural stability to assembly 10. An elongated slot is adapted to allow for adjustably mounting rack 11 to brackets 20. This allows for advantageous compatibility for mounting assembly 10 in various environments.

Assembly 10 includes a waterfall 30 adapted to allow cables to connect to a patch panel mounted on patch panel rack 11 while maintaining a desired bend radius. Waterfall 30 is connected to patch panel rack 11 on a front face 16 of patch panel rack 11 just below opening 15. In an exemplary embodiment, waterfall 30 can be detachably connected to rack 11. Detachably connecting waterfall 30 allows a user to interchange the waterfall according to a desired bend radius and/or appropriate size. An exemplary assembly associated with the present disclosure includes a patch panel rack 11 having waterfall 30 molded and/or manufactured as a single component.

In an exemplary embodiment, rear side 24 of each of brackets 20 typically define four apertures 21, vertically aligned, adapted to accept a connecting means and be mounted onto a cable management pathway providing structural stability. Connecting means associated with the present disclosure are rear side bolts. In an exemplary embodiment, rear side bolts are typically U bolts 40 adapted to engage brackets 20 through apertures 21 and connect to a pathway. U bolts 40 are then secured by nuts 41. Optional spacers 42 can be used to secure brackets 20 to a desired pathway. Spacers 42 ensure a tight fit when mounting assembly 10 to a pathway and also allows for interchanging assembly 10 among different pathways. In an exemplary embodiment, assembly 10 is detachably mounted onto a raceway, thus allowing a user to move and/or adjust assembly 10 to accommodate given space constraints.

In exemplary embodiments, as shown in FIGS. 2(a)-2(f) assembly 10 is adjustably mounted to a pathway to allow maneuverability with respect to varying spatial constraints. A cable management pathway is typically a wire raceway 201 or a ladder rack 202. Wire raceways are also commonly known as wire basket trays, wire cable trays, and/or a basket. Pathways are also commonly referred to as runways or raceways. These terms are interchangeable and in no way limit the scope of the present disclosure with reference to one specific nomenclature.

Figure 2A:
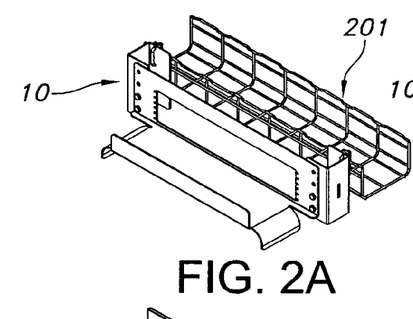
FIGS. 2(a)-2(f) are schematics illustrating exemplary embodiments of mounted assemblies associated with the present disclosure.
Figure 2B:
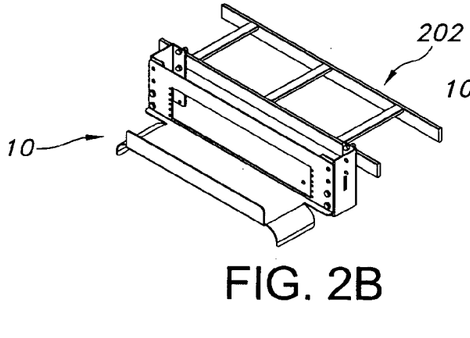
Figure 2C:
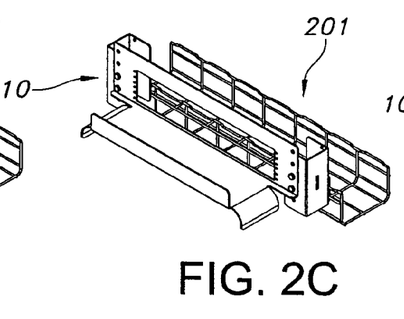
Figures 2D, 2F:
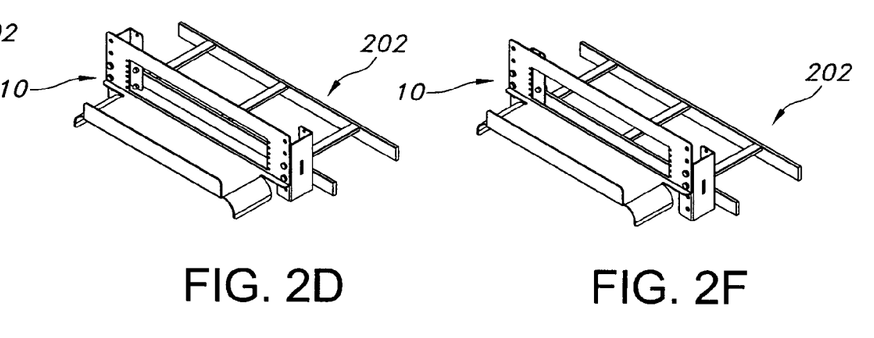
Figure 2E:
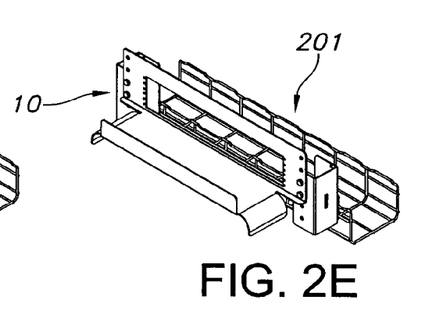

FIGS. 2(a), 2(c), and 2(e) illustrate exemplary embodiments with respect to the present disclosure wherein assembly 10 is mounted to wire raceway 201. FIGS. 2(b), 2(d), and 2(f) illustrate exemplary embodiments with respect to the present disclosure wherein assembly 10 is mounted to ladder rack 202. FIG. 2(a) illustrates an exemplary embodiment of assembly 10 side mounted onto raceway 201 such that rack 11 is substantially parallel with raceway 201. Rack 11 is mounted to each of brackets 20 through the bottom two apertures 21 of front side 22. Brackets 20 are mounted to raceway 201 through the top two apertures 21 of rear side 24. FIG. 2(b) illustrates mounting assembly 10 in a substantially similar manner to FIG. 2(a) with respect to selected apertures 21, however, assembly 10 is mounted onto ladder rack 202 rather than raceway 201.

FIG. 2(c) illustrates an exemplary embodiment associated with the present disclosure of assembly 10 mounted to a wire raceway, such that rack 11 is slightly above raceway 201. FIG. 2(c) shows mounting rack 11 to brackets 20 through the bottom two apertures 21 of front side 22 and mounting brackets 20 to race way 201 through the bottom two apertures 21 of rear side 24. FIG. 2(d) illustrates mounting assembly 10 in a substantially similar manner to FIG. 2(c) with respect to selected apertures 21, however, assembly 10 is mounted onto ladder rack 202 rather than raceway 201.

FIG. 2(e) illustrates an exemplary embodiment associated with the present disclosure of assembly 10 mounted to a wire raceway, such that rack 11 is located substantially above raceway 201. FIG. 2(e) shows mounting rack 11 to brackets 20 through the top two apertures 21 of front side 22 and mounting brackets 20 to race way 201 through the bottom two apertures 21 of rear side 24. FIG. 2(f) illustrates mounting assembly 10 in a substantially similar manner to FIG. 2(e) with respect to selected apertures 21, however, assembly 10 is mounted onto ladder rack 202 rather than raceway 201.

Figure 3A:
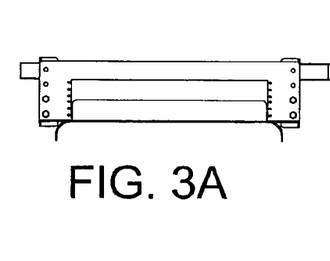
FIGS. 3(a)-3(c) are schematics illustrating a front face view of exemplary embodiments of an assembly associated with the present disclosure mounted at different positions with respect to the pathway.
Figure 3B:
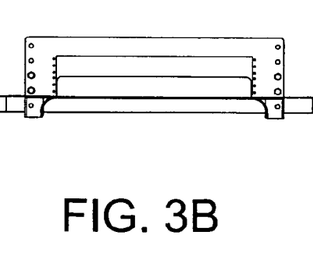
Figure 3C:
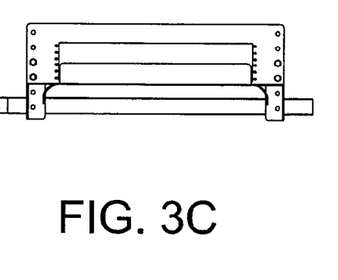

FIGS. 3(a)-3(c) illustrate front side views of the embodiments described and illustrated in FIGS. 2(a)-2(f). FIG. 3(a) shows a front side view of assembly 10 mounted to either of raceway 201 or ladder rack 202. FIG. 3(b) shows a front side view of assembly 10 mounted to either of raceway 201 or ladder rack 202. FIG. 3(c) shows a front side view of assembly 10 mounted to either of raceway 201 or ladder rack 202.

Figure 4:
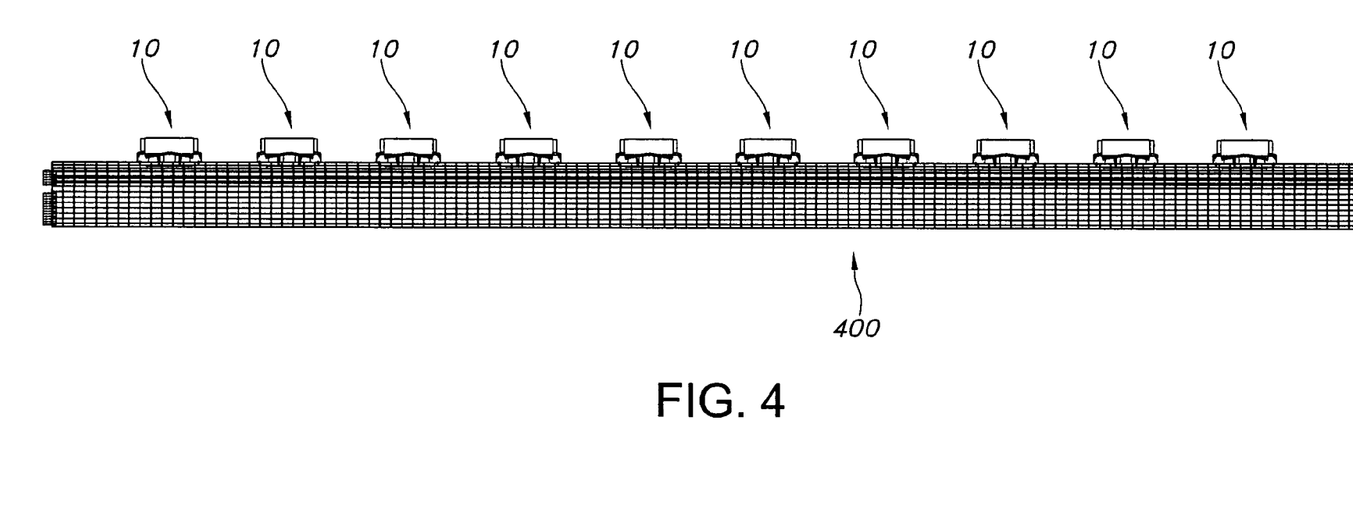
FIG. 4 is a schematic illustrating a front face view of a plurality of assemblies associated with the present disclosure mounted onto a wire raceway.

A typical data center will have several rows of telecommunications cabinets and/or closets substantially aligned in a room such as a data center. Typically hanging over the closets are cable management pathways adapted to allow for many cables to connect to designated ports and/or destinations in different areas of the room and/or leading outside the room. FIG. 4 illustrates a top view of an exemplary embodiment associated with the present disclosure of a typical wire raceway 400 having a plurality of assemblies 10 mounted therein. Raceway 400 is typically located above a row of telecommunications cabinets (not shown). Mounting an assembly 10 above each telecommunications cabinet allows for desired patch panel access within advantageous proximity and substantially reducing cable quantity. Moreover, mounting patch panels above a cabinet rather than occupying a rack space within the cabinet allows for more servers and/or desired devices to fit within the cabinet, thus saving cost on space limitations.

In an embodiment associated with the present disclosure, assemblies 10 are mounted to raceway 400 such that at least one of the plurality of assemblies 10 are not parallel with at least one other of the plurality of assemblies 10. Each assembly can be positioned at a different height relative to the other assemblies in order to accommodate for spatial constraints of a given room.

Figure 5:
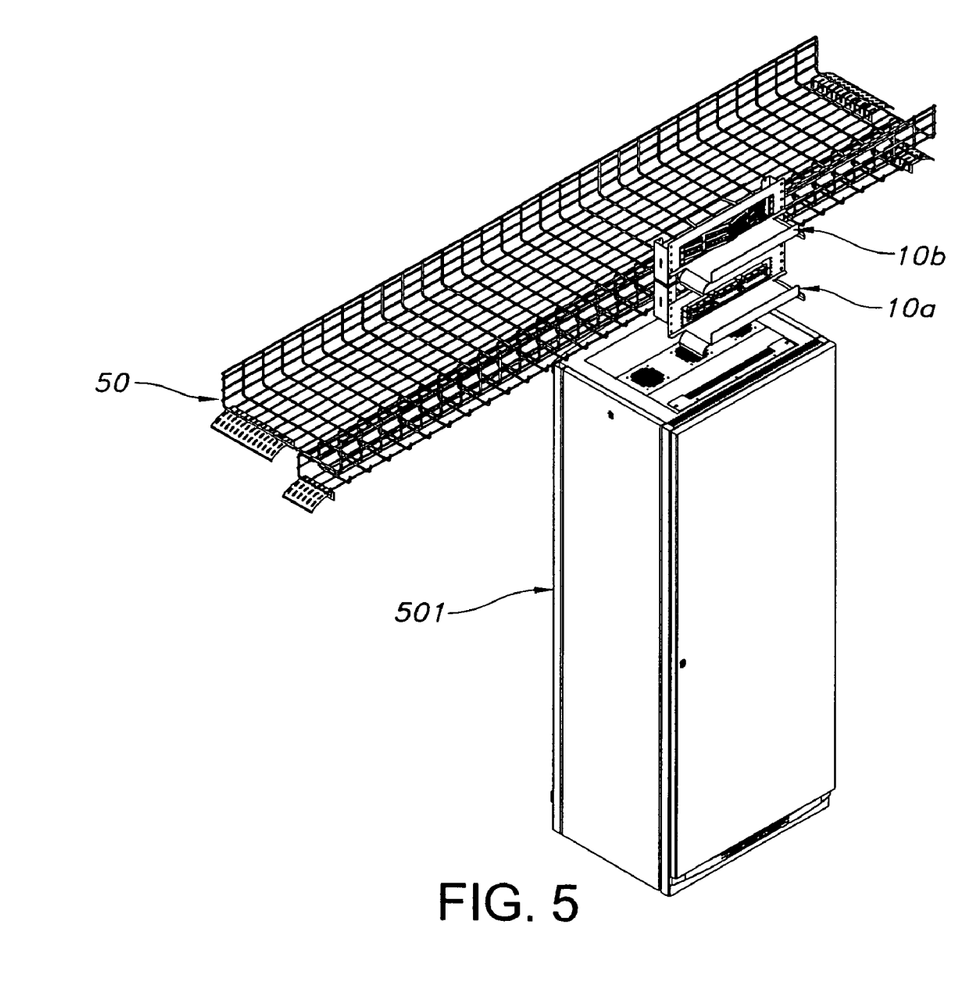
FIG. 5 is a schematic illustrating multiple assemblies associated with the present disclosure side mounted on a wire raceway overhead a telecommunications cabinet.

FIG. 5 illustrates an exemplary multi-level assembly embodiment. Raceway 500 runs overhead relative to telecommunications cabinet 501. Assemblies 10(a) and 10(b) are mounted onto raceway 500 according to the present disclosure described herein. Assemblies 10(b) is mounted substantially vertically aligned to assembly 10(a) directly overhead relative to cabinet 501. The embodiment shown in FIG. 5 allows devices associated cabinet 501 to have proximate electrical access to multiple patch panels. However, patch panel access associated with assemblies 10(a) and 10(b) is not limited to cabinet 501. In an exemplary embodiment, cabinets adjacent with respect to cabinet 501 may have access and electronically connect to assemblies 10(a) and/or 10(b).

Figure 6:
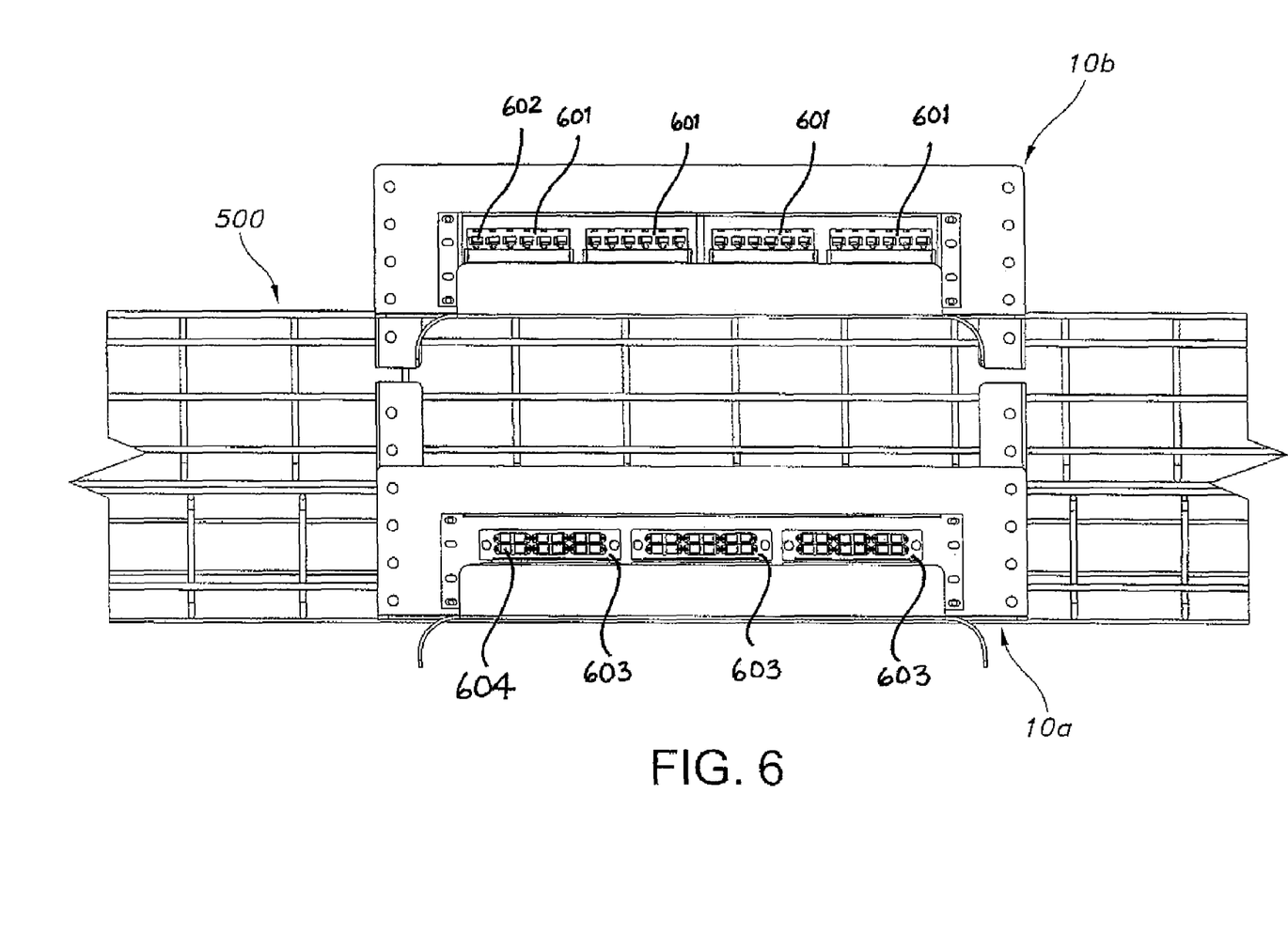
FIG. 6 is a schematic illustrating a front face view of a multi-assembly embodiment side mounted on a wire raceway.
Figure 7:
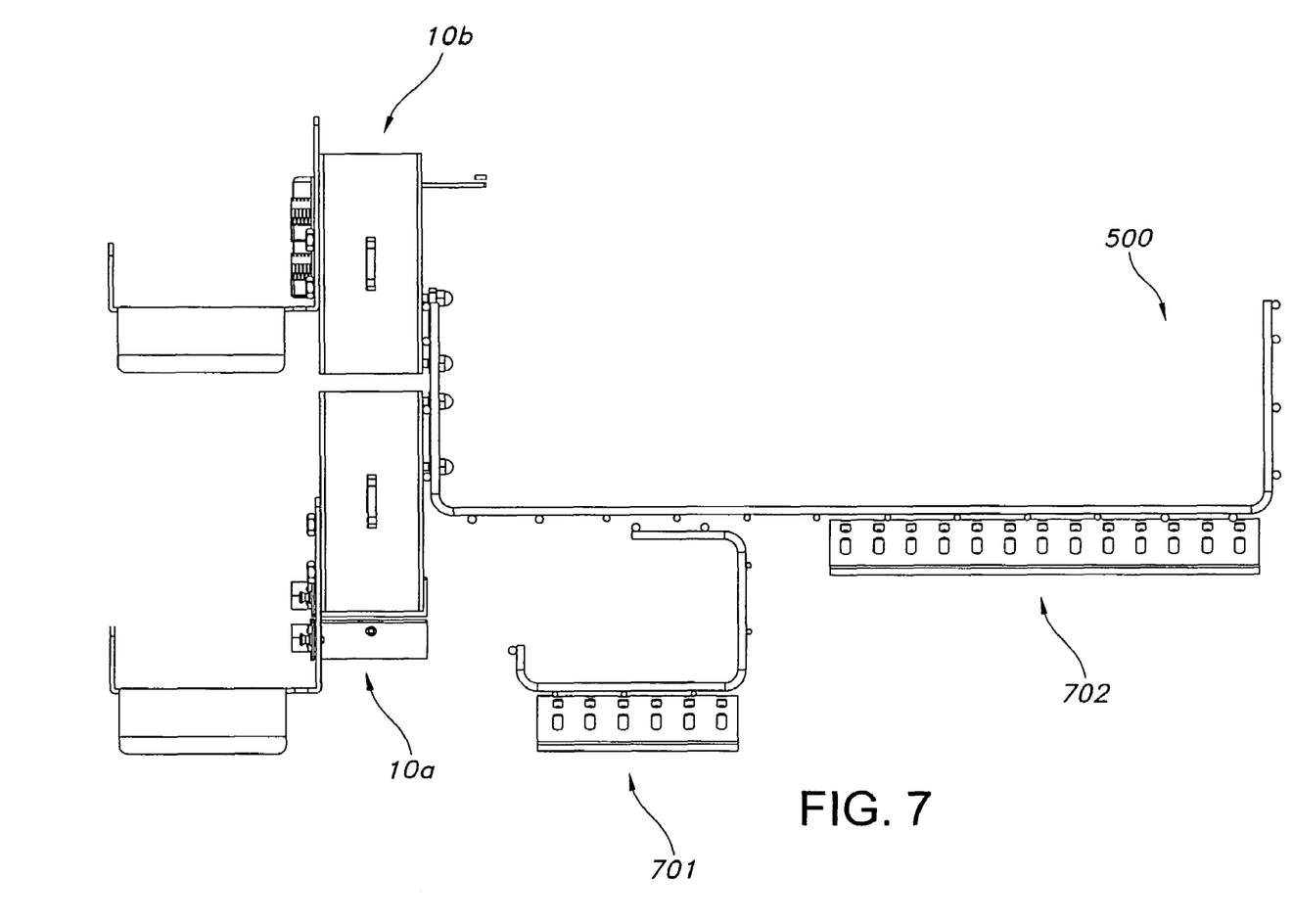
FIG. 7 is a schematic illustrating a side view of a multi-assembly embodiment side mounted on a wire raceway.

FIG. 6 illustrates a front face view of the exemplary embodiment of FIG. 5 showing exemplary mounting positions of assemblies 10(a) and 10(b) relative to raceway 500, and further showing a plurality of patch panels 601 associated with the assembly 10(a) (each such patch panel 601 including a plurality of ports 602), and a plurality of patch panels 603 associated with the assembly 10(b) (each such patch panel 603 including a plurality of ports 604). FIG. 7 illustrates a cross sectional view of the exemplary embodiments of FIG. 5 showing functional structures associated with raceway 500. An exemplary embodiment of raceway 500 includes a cable exit guide 701 and a cable dropout 702. Guide 701 and dropout 702 provide for cables running along raceway 500 to selectively connect to desired destinations including, for example, patch panels 601, 603 (see FIG. 6) associated with assemblies 10(a) and 10(b).

Figure 8A:
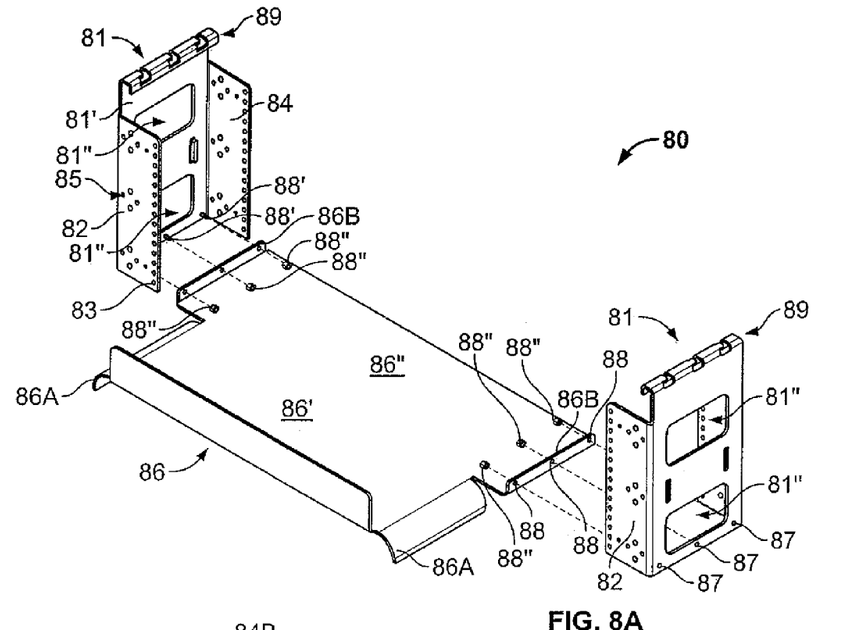
FIG. 8A is a perspective exploded view of an exemplary assembly with a waterfall base associated with the present disclosure.
Figure 8B:
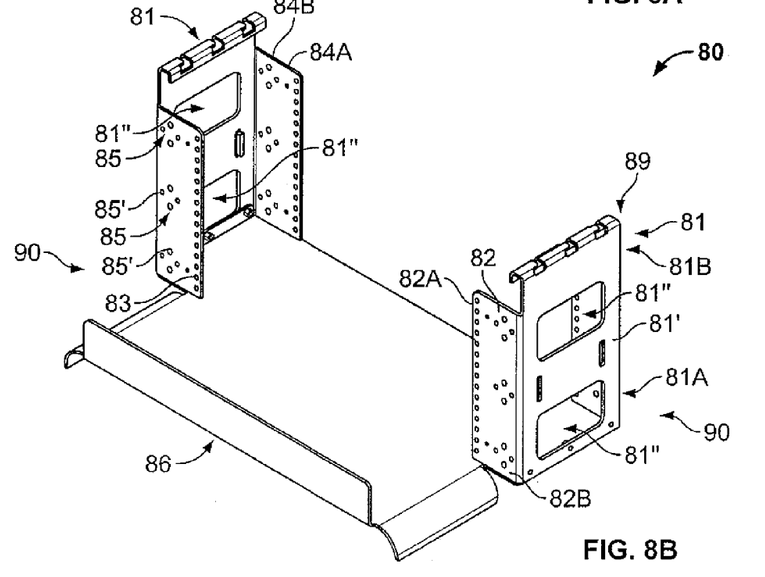
FIG. 8B is an assembled perspective view of the assembly illustrated with respect to FIG. 8A.
Figure 9A:
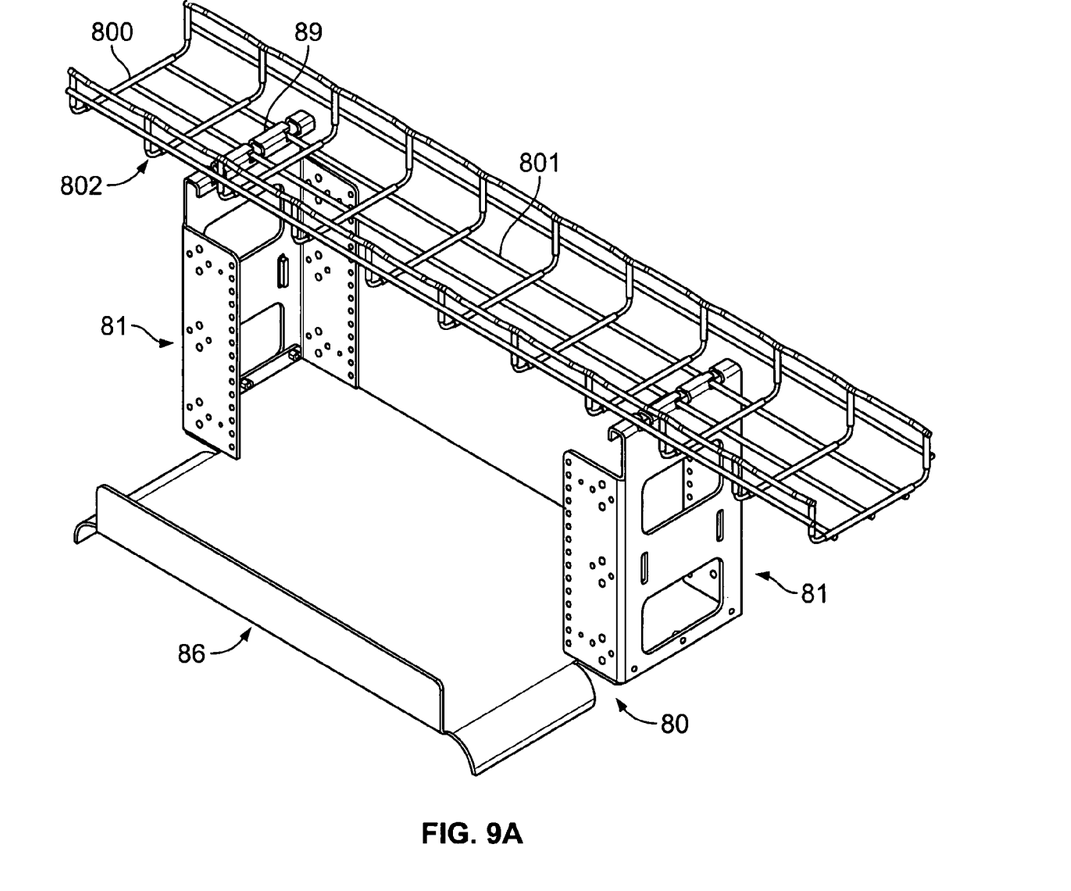
FIG. 9A illustrates the assembly with respect to FIG. 8B mounted with respect to a wire cable management pathway.
Figure 9B:
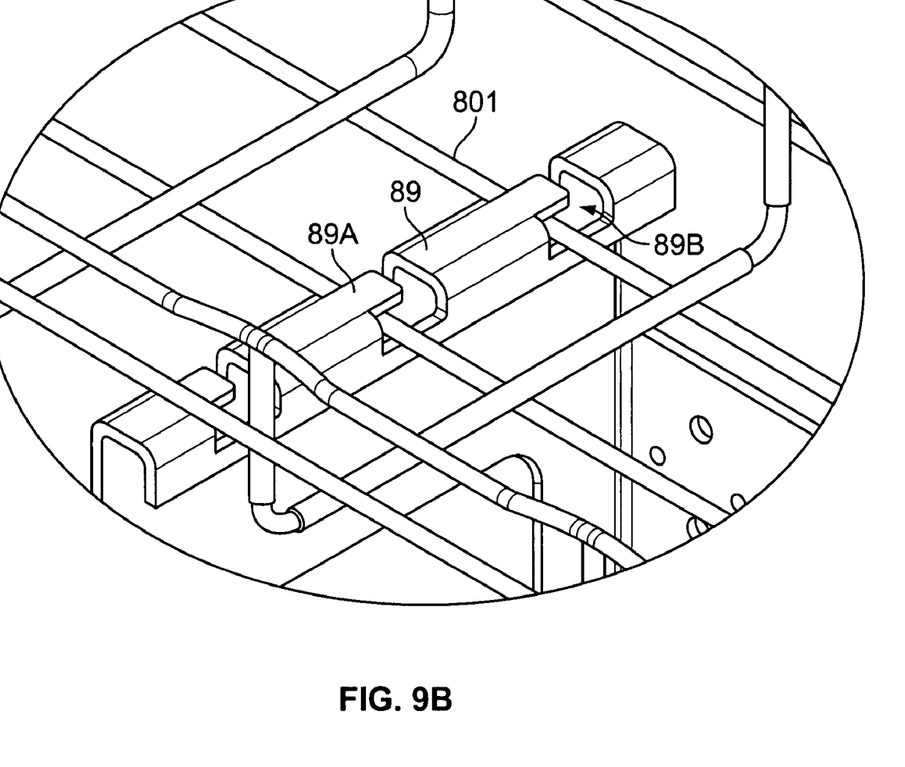
FIG. 9B illustrates an enlarged view of the mounting interaction associated with mounting of the brackets with respect to the wire cable management pathway with respect to FIG. 9A.

With reference to FIGS. 8A, 8B, 9A and 9B, an exemplary wire cable management pathway mounting assembly 80 is shown. FIGS. 8A and 8B illustrate an exploded and assembled view of an exemplary assembly 80 respectively. FIG. 9A illustrates an exemplary assembly 80 mounted with respect to an exemplary wire cable management pathway 800. As shown in FIG. 9A, when mounting assembly 80 with respect to an underneath portion 802 of pathway 800, assembly 80 is substantially hanging and/or supported by pathway 800. FIG. 9B illustrates an enlarged view of a portion of a cable management pathway mounting feature 89 of an exemplary assembly 80 associated with the present disclosure.

Exemplary assembly 80 includes a pair of mounting brackets 81. It is understood that mounting brackets 81 can also be referred to as uprights distinguished as right and left uprights with respect to an exemplary waterfall base 86. Mounting brackets 81 are typically spaced apart to allow for mounting of a waterfall base 86. Waterfall base 86 includes a front portion 86' integrally formed with a rear portion 86". Front portion 86' defines a substantially flat surface having a curved drop-off portion 86A on each horizontal end 90 (see FIG. 8B) of assembly 80. Front portion 86' defines a substantially waterfall geometry similar to waterfall 30 as described with respect to FIG. 1. The waterfall geometry associated with 86' is shaped and sized to maintain an appropriate bend radius for effective cable management.

Rear portion 86" defines a substantially flat surface extending rearwardly with respect to front portion 86'. Rear portion 86" includes a mounting flange 86B at each horizontal end 90 (see FIG. 8B) of assembly 80. Typically, mounting flanges 86B extend vertically with respect to rear portion 86" and define at least one flange aperture 88. In an exemplary, each of flanges 86B define a plurality of flange apertures 88. In a further exemplary embodiment, flanges 86B define three flange apertures 88. Each flange aperture 88 is adapted to receive a securing feature 88'. Each securing feature 88' is adapted to pass through a flange aperture 88 and secure waterfall base 86 with respect to brackets 81. Securing features 88' can be any member selected from the group consisting of a screw, bolt, nail and combinations thereof. In an exemplary embodiment, securing feature 88' is a screw.

In an exemplary embodiment, waterfall base 86 is secured and/or mounted with respect to brackets 81 by way of passing a securing feature 88' through a flange aperture 88 and a support aperture 87 defined on a bottom portion 81A associated with support surface 81', and engaging with a lock nut 88". Each securing feature 88' engages with at least one lock nut 88" to effectively secure waterfall base 86 with respect to brackets 81.

Each bracket 81 includes support surface 81' defining a bottom portion 81A and a top portion 81B. Bottom portion 81A defines at least one support aperture 87. In an exemplary embodiment, bottom portion 81A defines a plurality of support apertures 87. In a further exemplary embodiment, bottom portion 81A defines three support apertures 87. Each support aperture 87 is adapted to receive a securing feature 88'. Securing feature 88' is adapted to further pass through support aperture 87 and engage with a lock nut 88" thereby securing waterfall base 86 with respect to brackets 81. Once assembled, each bracket 81 is positioned on opposite horizontal ends 90 of assembly 80 as illustrated with respect to FIGS. 8A and 8B.

Top portion 81B of support surface 81' includes at least one upwardly extending wire cable management pathway mounting feature 89 adapted to securely mount the pair of mounting brackets 81 with respect to a wire cable management pathway 800. In an exemplary embodiment, cable management pathway mounting feature 89 is a mounting clip feature 89. In an exemplary embodiment, top portion 81B includes a plurality of mounting clip features 89. Each mounting clip feature 89 can be integrally formed with respect to top portion 81B. Each mounting clip feature 89 extends upwardly with respect to top portion 81B and defines a substantially curved portion (also referred to as a bent over portion) adapted to securely mount bracket 81 with respect to a wire cable management pathway 800. In an exemplary embodiment, the curved portion of mounting clip feature 89 curves substantially inward with respect to waterfall base 86 substantially defining an upside down U-shape geometry. In an exemplary embodiment, wire cable management pathway 800 is a wire raceway adapted to allow cables associated with an exemplary telecommunications environment to extend across significant distances in an orderly fashion.

In an exemplary embodiment, each mounting clip feature 89 includes a fold over tab 89A. Tab 89A extends horizontally with respect to clip feature 89 thereby defining a gap opening 89B for receiving an individual wire 801 associated with pathway 800. Once each gap opening 89B associated with bracket 81 has received an individual wire 801, fold over tab 89A can be manipulated to substantially fold over wire 801 thereby securely mounting bracket 81 with respect to pathway 800. In an exemplary embodiment, a screw driver can be effective in appropriately securing fold over tab 89A with respect to individual wire 801. As illustrated in FIG. 5, in an exemplary embodiment, a cable management pathway, such as pathway 50 associated with FIG. 5 or pathway 800 associated with FIGS. 9A and 9B, is positioned substantially above an exemplary telecommunications closet, such as closet 501 associated with FIG. 5. Exemplary assembly 80 associated with the present disclosure allows for mounting of patch panels substantially underneath an exemplary pathway 800.

Each bracket 81 includes a front side surface 82 and an oppositely positioned rear side surface 84. Front side surface 82 and rear side surface 84 extend inwardly towards an oppositely positioned bracket 81 in a substantially perpendicular relationship with respect to support surface 81'. In an exemplary embodiment, front side surface 82 and rear side surface 84 are substantially aligned and parallel with respect to each other. Accordingly, each of front side surface 82 and rear side surface 84 define a plurality of patch panel mounting apertures 83. Typically, apertures 83 are substantially vertically aligned along each of front side surface 82 and rear side surface 84. Each of front side surface 82 and rear side surface 84 defines an inner portion 82A and 84A respectively and an outer portion 82B and 84B respectively. In an exemplary embodiment, apertures 83 are substantially vertically aligned along inner portion 82B and 84B.

Patch panel mounting apertures 83 are adapted to receive securing features (not shown) for mounting a plurality of ports, often hosted on an exemplary patch panel (not specifically shown in FIGS. 8A, 8B, 9A, or 9B) (see, e.g., the pluralities of ports 602, 604 respectively associated with the patch panels 601, 603 of the assemblies 10(*a*) and 10(*b*), as shown and described above with reference to FIG. 6), with respect to brackets 81. A plurality of apertures 83 allows for several different mounting positions of the patch panel with respect to brackets 81.

In an exemplary embodiment, each of front side surface 82 and rear side surface 84 further define at least one wire management clip aperture set 85. In an further exemplary embodiment, each of front side surface 82 and rear side surface 84 further define a plurality of wire management clip aperture sets 85. Each wire management clip aperture set 85 includes at least one aperture 85' and typically includes a plurality of apertures 85'. In an exemplary embodiment, aperture set 85 includes four apertures 85' arranged in a substantially diamond pattern, often referred to as a four hole pattern. Each aperture set 85 is adapted to allow for mounting of a wire management clip (not shown) with respect to bracket 81. In an exemplary embodiment, three aperture sets 85, arranged in a substantially diamond configuration, are aligned vertically along outer portion 82B of front side surface 82 and outer portion 84B of rear side surface 84.

In an exemplary embodiment, support surface 81' defines a pair of vertically spaced apart openings 81". Openings 81" are adapted to allow for a plurality of cables, associated with an exemplary telecommunications closet, to pass through bracket 81 and facilitate effective and efficient cable management.

Although the present disclosure has been described with reference to exemplary embodiments and implementations thereof, the disclosed assemblies and methods are not limited to such exemplary embodiments/implementations. Rather, as will be readily apparent to persons skilled in the art from the description provided herein, the disclosed assemblies and methods are susceptible to modifications, alterations and enhancements without departing from the spirit or scope of the present disclosure. Accordingly, the present disclosure expressly encompasses such modification, alterations and enhancements within the scope thereof.

What is claimed:

1. A data communications port mounting assembly, comprising:
   a) a first mounting bracket and a second mounting bracket, each of the first and second mounting brackets including a support surface, a front side surface, and a rear side surface, the support surface including a bottom portion and a top portion, the bottom portion of the support surface being disposed between the front side surface and the rear side surface, and the top portion of the support surface being disposed above the bottom portion thereof; and
   b) a waterfall base mounted between the first mounting bracket and the second mounting bracket, the waterfall base including a rear portion and a front portion, the front portion being disposed in front of the rear portion, the rear portion defining a horizontally-extending surface disposed between the first mounting bracket and the second mounting bracket, the rear portion further including opposite horizontal ends at which the waterfall base is mounted to the bottom portion of the support surface of the first mounting bracket, and to the bottom portion of the support surface of the second mounting bracket, respectively, the front portion defining a horizontally-extending surface disposed in front of the horizontally-extending surface defined by the rear portion, the front portion further including opposite horizontal ends;

wherein the top portion of the support surface of each of the first and second mounting brackets includes at least one upwardly extending cable management pathway mounting feature adapted to permit the respective mounting bracket to be securely mounted to an underneath portion of a cable management pathway so as to permit the data communications port mounting assembly to be supported by the underneath portion of the cable management pathway;

wherein at least one of: 1) the front side surface of the first mounting bracket and the front side surface of the second mounting bracket, or 2) the rear side surface of the first mounting bracket and the rear side surface of the second mounting bracket, cooperate to define a corresponding front or rear side mounting surface sized, shaped, oriented, and configured to permit complementary structure of a patch panel for hosting a plurality of data communications ports to be securely mounted to the data communications port mounting assembly above the waterfall base; and wherein each horizontal end of the opposite horizontal ends of the front portion of the waterfall base defines a respective curved drop-off portion sized, shaped, oriented, and configured to permit electrical cables extending vertically upward from electrical equipment disposed beneath the waterfall base to the patch panel mounted above the waterfall base to maintain a desired bend radius.

2. The assembly according to claim 1, wherein the cable management pathway is a wire raceway, and wherein each upwardly extending cable management pathway mounting feature of the at least one upwardly extending cable management pathway mounting feature of the top portion of the support surface of each of the first and second mounting brackets is a substantially curved mounting clip feature having a horizontally extending fold over tab defining a gap opening to receive at least one wire of the wire raceway.

3. The assembly according to claim 2, wherein the fold over tab is adapted to fold over the at least one wire received by the defined gap opening to allow the respective mounting bracket to be securely hung from the underneath portion of the cable management pathway.

4. The assembly according to claim 2, wherein the curved mounting clip feature is fabricated to substantially curve inwardly toward the waterfall base, thereby substantially defining a U-shape geometry.

5. The assembly according to claim 1, wherein the at least one upwardly extending cable management pathway mounting feature of each of the first and second mounting brackets is a plurality of upwardly extending cable management pathway mounting features.

6. The assembly according to claim 1, wherein in each of the first and second mounting brackets, each of the front side surface and the rear side surface is integrally formed with the support surface and substantially defines a perpendicular relationship therewith, and further wherein each of the front side surface and the rear side surface of the first mounting bracket extends inwardly toward the second mounting bracket, and each of the front side surface and the rear side surface of the second mounting bracket extends inwardly toward the first mounting bracket.

7. The assembly according to claim 1, wherein in each of the first and second mounting brackets, the front side surface includes a plurality of patch panel mounting apertures, and wherein the plurality of patch panel mounting apertures of the front side surface of the first mounting bracket and the plurality of patch panel mounting apertures of the front side surface of the second mounting bracket cooperate to allow the patch panel to be mounted to the front side surfaces of the first and second mounting brackets.

8. The assembly according to claim 7, wherein in each of the first and second mounting brackets, each of the front side surfaces of the first and second mounting brackets is positioned in front of the respective rear side surface thereof such that each of the front side surfaces of the first and second mounting brackets is aligned with, and oriented parallel to, the respective rear side surface thereof, and further wherein in each of: 1) the plurality of patch panel mounting apertures of the front side surface of the first mounting bracket, 2) the plurality of patch panel mounting apertures of the rear side surface of the first mounting bracket, 3) the plurality of patch panel mounting apertures of the front side surface of the second mounting bracket, and 4) the plurality of patch panel mounting apertures of the rear side surface of the second mounting bracket, the patch panel mounting apertures of such plurality are substantially vertically aligned with each other.

9. The assembly according to claim 8, wherein the plurality of patch panel mounting apertures of the front side surface of the first mounting bracket and the plurality of patch panel mounting apertures of the front side surface of the second mounting bracket cooperate to allow the patch panel to be adjustably mounted to the front side surfaces of the first and second mounting brackets, and the plurality of patch panel mounting apertures of the rear side surface of the first mounting bracket and the plurality of patch panel mounting apertures of the rear side surface of the second mounting bracket cooperate to allow the patch panel to be adjustably mounted to the rear side surfaces of the first and second mounting brackets.

10. The assembly according to claim 1, wherein in the waterfall base, the front portion is integrally formed with the rear portion, including wherein the horizontally-extending surface defined by the front portion is substantially flat, the horizontally-extending surface defined by the rear portion is substantially flat, and the horizontally-extending surface defined by the rear portion extends rearward from the horizontally-extending surface defined by the front portion, and further wherein each horizontal end of the opposite horizontal ends of the rear portion includes a respective mounting flange by which the waterfall base is mounted to the first and second mounting brackets.

11. The assembly according to claim 10, wherein each of the mounting flanges of the rear portion of the waterfall base includes at least one flange aperture, and wherein each of the bottom portions of the support surfaces of the first and second mounting brackets includes at least one support aperture aligned with a corresponding instance of the at least one flange aperture such that a securing feature can pass through the respective mounting flange and the respective support surface to secure the waterfall base to the respective mounting bracket.

12. A method for cable management and data communication port access associated with telecommunications closets comprising the steps of:
  a) providing a first mounting bracket and a second mounting bracket, each of the first mounting bracket and the second mounting bracket including a support surface, the support surface including a bottom portion and a top portion, the top portion of the support surface being disposed above the bottom portion thereof and including at least one upwardly extending cable management pathway mounting feature;
  b) providing a plurality of data communications ports hosted on the first and second mounting brackets;
  c) mounting a waterfall base between the bottom portion of the first mounting bracket and the bottom portion of the second mounting bracket, the waterfall base including at least one curved drop-off portion;
  d) mounting the top portion of the first mounting bracket to a cable management pathway via the at least one upwardly extending cable management pathway mounting feature of the first mounting bracket such that the first mounting bracket is supported by the cable management pathway;
  e) mounting the top portion of the second mounting bracket to the cable management pathway via the at least one upwardly extending cable management pathway mounting feature of the second mounting bracket such that the second mounting bracket is supported by the cable management pathway;
  f) connecting an electrical cable extending vertically upward from electrical equipment positioned below the cable management pathway to a data communications port hosted on the first and second mounting brackets and positioned below the cable management pathway; and
  g) employing the at least one curved drop-off portion of the waterfall base to maintain a desired bend radius in the electrical cable.

13. The method according to claim 12, wherein the cable management pathway is a wire raceway, and wherein each upwardly extending cable management pathway mounting feature of the at least one upwardly extending cable management pathway mounting feature of the top portion of the support surface of each of the first and second mounting brackets is a substantially curved mounting clip feature having a horizontally extending fold over tab defining a gap opening to receive at least one wire of the wire raceway.

14. The method according to claim 13, wherein the fold over tab is adapted to fold over the at least one wire received by the defined gap opening to allow the respective mounting bracket to be securely hung from the cable management pathway.

15. The method according to claim 12, wherein the top portion of the support surface of each of the first and second mounting brackets includes a plurality of upwardly extending cable management pathway mounting features adapted to securely mount the respective mounting bracket to an underneath portion of the cable management pathway.

* * * * *